H. Sager. Wagon & Car Brake.

No. 119,655. Patented Oct. 3, 1871.

//119,655

UNITED STATES PATENT OFFICE.

HENRY SAGER, OF PENN STATION, PENNSYLVANIA.

IMPROVEMENT IN WAGON-BRAKES.

Specification forming part of Letters Patent No. 119,655, dated October 3, 1871.

*To all whom it may concern:*

Be it known that I, HENRY SAGER, of Penn Station, in the county of Westmoreland and State of Pennsylvania, have invented a new and useful Improvement in Wagon or Car-Brakes; and I do hereby declare that the following is a full, clear, and exact description thereof, which will enable others skilled in the art to make and use the same, reference being had to the accompanying drawing forming part of this specification.

My invention consists in the improvement of brakes, as hereinafter fully described and subsequently pointed out in the claim.

Figure 1:
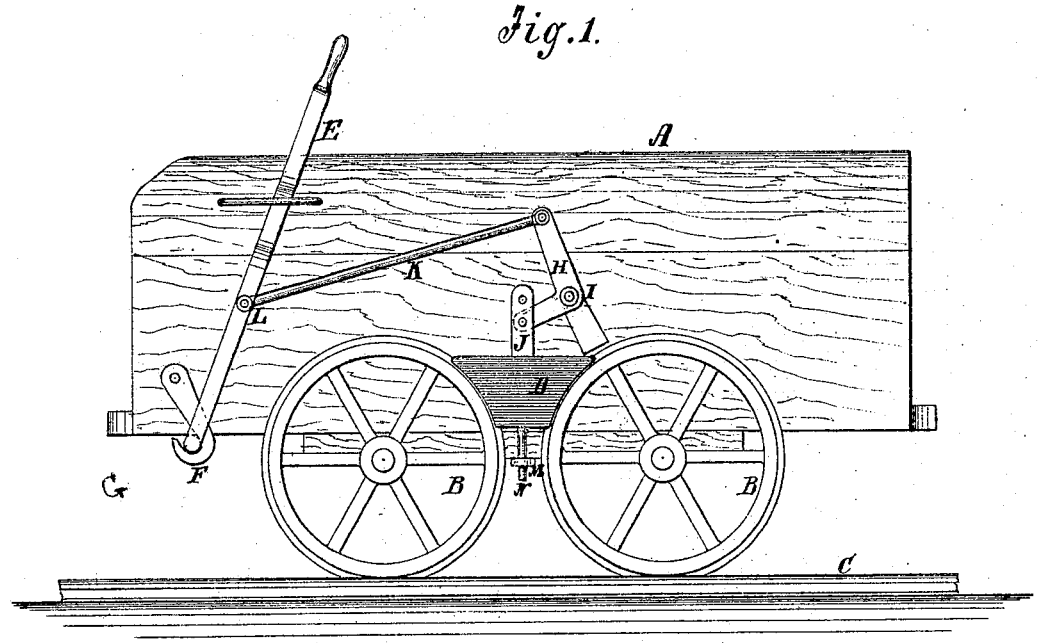
Figure 2:
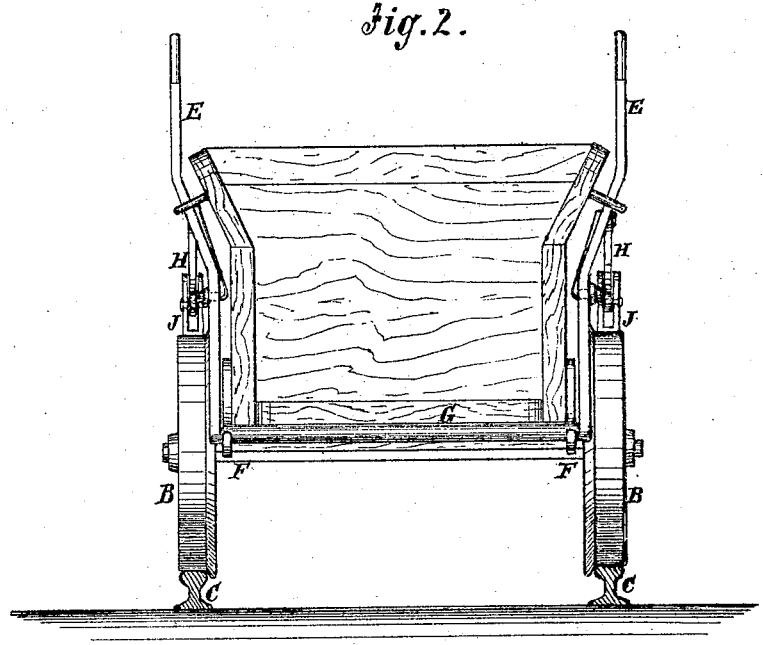

In the accompanying drawing, Figure 1 represents a side view of a coal-wagon with my improved brake applied to the two wheels. Fig. 2 is an end view.

Similar letters of reference indicate corresponding parts.

A is the wagon-body. B B represent the wheels; C C, the track on which the coal-wagon or cars run. D is the brake. This brake is a simple block of wood or other material suitable for the purpose, fitted between the wheels, as seen in Fig. 1, so connected with a brake-lever by a rod and bell-crank that it may be pressed onto or against the wheels with any required force by the driver to retard or stop the motion of the wagon by the friction thus produced. E is the brake-lever, whose fulcrum is at its lower end at the point F. In this example of my invention I show a brake upon each side of the wagon with the levers connected together by the shaft G, which passes under the bottom of the wagon, as seen in Fig. 2. This shaft is supported on the fulcrum-bearings F F from the sides of the body, as seen in the drawing.

By this arrangement it will be seen that the brakes will be operated simultaneously; but I do not confine myself to this arrangement, as the levers may be separated so as to operate either one or both of the brakes, or so that a car or wagon may have but a single brake, should one be sufficient, as it might be when there were no heavy grades; neither do I confine myself to applying the brake to the upper portion of the wheels, as seen in Fig. 1, or by down pressure. The double brake may be applied below the center or middle of the wheels, and by upward pressure, if desired.

H is the bell-crank, which turns on the pivot I, the latter being supported by the side of the wagon-body. J is a forked bar, rigidly attached to the brake-block, to which one arm of the bell-crank is pivoted. K is a rod, by which the other arm of the bell-crank is connected with the brake-lever E, as seen at L. M is a guide-plate attached to the bottom of the wagon, and N is a guide-pin attached to the brake. This arrangement keeps the brake in its proper position.

A slight movement of the brake-lever applies or releases the brake to or from the wheels.

Accidents are almost daily occurring in coal-mines, resulting in injuries to man or beast, or to the wagons, for the want of some efficient means for controlling the motion of the wagons or cars. By my improvement the momentum may be checked almost instantly, and the wagon or car controlled by the driver in the easiest and most perfect manner.

Having thus described my invention, I claim as new and desire to secure by Letters Patent—

The arrangement, in combination with the wheels of a wagon or car, of the brake D, bell-crank H, rod K, and brake-lever E, substantially as and for the purposes described.

HENRY SAGER.

Witnesses:
MICHAEL B. CLINE,
JOHN B. WATSON. (22)